US006876976B1

(12) United States Patent
Setteducati

(10) Patent No.: US 6,876,976 B1
(45) Date of Patent: Apr. 5, 2005

(54) MERCHANDISING MAGIC TRICKS, MECHANICAL OR ACTION/MOTION PUZZLES

(76) Inventor: Mark Setteducati, 218 E. 17 St., New York City, NY (US) 10003

( * ) Notice: Subject to any disclaimer, the term of this patent is extended or adjusted under 35 U.S.C. 154(b) by 780 days.

(21) Appl. No.: 09/583,814

(22) Filed: May 30, 2000

(51) Int. Cl.[7] ............................................. G60F 17/60
(52) U.S. Cl. ....................................................... 705/26
(58) Field of Search ..................................... 705/27, 26

(56) References Cited

U.S. PATENT DOCUMENTS

| | | | |
|---|---|---|---|
| 3,729,581 A | 4/1973 | Anderson | 178/6.8 |
| 5,708,782 A | 1/1998 | Larson et al. | 395/214 |
| 5,913,210 A | 6/1999 | Call | 707/4 |
| 5,950,173 A | 9/1999 | Perkowski | 705/26 |
| 5,963,916 A | 10/1999 | Kaplan | 705/26 |

FOREIGN PATENT DOCUMENTS

JP        2002-78986    *  3/2002

OTHER PUBLICATIONS

The Cube Puzzle, © 1996 by the Mandalay Box Company.*

* cited by examiner

Primary Examiner—Kenneth R. Rice
(74) Attorney, Agent, or Firm—Robert W. J. Usher

(57) ABSTRACT

When merchandising magic tricks, a web site has a first information set with a motion picture of expert performance of each trick type and a second information set with graphical instructions for perfecting performance of each trick type. Tricks are supplied in a store, with either packaging or an adjacent advertising display for each different type of magic trick marked with first indicia including the web site address and a first key identifying the type of magic trick and visible to a customer prior to purchase so that the customer can access the web site for a demonstration of the trick prior to purchase. Second indicia for that type of trick and a second key, different from the first key, are concealed from the customer by the trick packaging so that a customer can access the instructions for perfecting performance only after purchasing the magic trick.

7 Claims, 4 Drawing Sheets

MERCHANDISING MAGIC TRICKS, MECHANICAL OR ACTION/MOTION PUZZLES

FIELD OF THE INVENTION

The invention relates to a method of merchandising magic tricks or mechanical/action puzzles and to an apparatus or system for carrying out the method.

A well recognized problem in marketing or merchandising magic tricks or action puzzles is that it can be difficult to induce a purchase without conveying a complete impression of the full theatrical or physical effect of the trick or puzzle to a prospective purchaser. However, conveying the full impact of physical actions involved in the performance of the magic trick or puzzle is difficult or impossible to achieve by simply displaying illustrated instructions on the trick or puzzle packaging or on an adjacent advertising display. The most effective approach is to provide a live demonstration by an expert actually performing the trick or puzzle for the prospective customers. However, providing an expert performer at each point of sale is simply impractical or prohibitively expensive.

It can be very difficult for a purchaser himself to learn to perform the trick or puzzle expertly. It would be extremely time consuming for an expert to teach purchasers on an individual basis, particularly taking into consideration the inherently different learning abilities of different individuals. It is also usually impractical or too expensive to provided a motion picture demonstration such as a video for each of many tricks or puzzles at each point of sale. Furthermore, making the performance technique or solution available to individuals prior to purchase could reduce the personal impact or magical effect, actually reducing the incentive to purchase.

SUMMARY OF THE INVENTION

According to one aspect of the invention, a method of merchandising different types of magic tricks or mechanical/action puzzles comprises the steps of:

providing a remote information site having a graphical interface accessible by one of line and wireless means and containing a first information set providing a motion picture demonstration of expert performance of each type of trick and puzzle and a second information set providing graphical instructions for perfecting performance of each type of trick and puzzle, respectively, providing a supply of ones of different types of tricks and puzzles with packaging for purchase/at a point of purchase remote from the information site/ (in a store) with one of the packaging and an adjacent advertising display for each different type of magic trick marked with first indicia including an information site address and a first key identifying the type of magic trick and puzzle and visible to a potential customer prior to purchasing the magic trick and puzzle and the packaging containing second indicia for that type of trick and puzzle, and being a second key, different from the first key and concealed from the customer until purchase of the trick and puzzle;

whereby by a potential customer can access the first information set for an expert demonstration of a type of trick or puzzle by inputting the graphical interface according to the first key for that type and a purchaser can access the second information set for the instructions for perfecting performance by inputting the second indicia revealed by opening the packaging after purchasing the magic trick.

In general a key may be an input code including numerals, letters or symbols, or a set of input instructions. However, the first key may be simply the product name.

Suitably, the remote information site is one of an internet and web site.

According to another aspect, the invention provides a method/system of merchandising different magic tricks comprising the steps of:

establishing a remote information (web) site containing first animated or motion picture information for demonstrating the different magic tricks and second graphical information for perfecting performance of the different magic tricks by a purchaser, the first information being accessed, by the potential customer inputting at the web site a first indicia visibly marked on one of packaging of a magic trick and associated material advertising a magic trick, and the second information being accessed by the potential customer inputting at the web site a key according to a second indicia revealed only to a customer (by opening the packaging) after purchasing the magic trick.

The second information set may comprise means to display successive action sequences illustrating the trick or puzzle. According to another aspect, the invention provides a method of marketing a magic club by:

providing a remote information site accessible to visitors by one of line and wireless means and having a graphical interface to first and second information sets; the first information set providing motion picture demonstrations of performance of different types of one of magic tricks and action puzzles and the second information set providing motion picture instructional demonstration of solutions in performing said different types of one of magic tricks and puzzles;

providing free access for a visitor to the first information set and, offering access to a visitor to the second information set by one of payment of a membership fee and purchase of a product in a retail store or at a location associated with the web site.

Preferably, the web site has a third information set and a fourth information set similar to the first and second information sets and relating to different types of magic trick and puzzles advertised at a remote location and purchased by the visitor.

A multiple revenue stream can therefore be obtained including fees/royalties from third party manufacturer's with invitations on their product packaging to visit the site and access keys to the secret locations available only after purchase of their product; site club membership fees which provide privileged access to instructional demonstrations and secrets/solutions of other magic tricks originating from the web site; and, from direct or indirect sales of hardware of both site originating and further magic trick or puzzles of third parties found by visits to the site.

Thus, either purchasing or seeing the product in a retail store or other facility separate from the web site can influence a person to access the web site and pay a membership fee, while, furthermore, accessing the web site by surfing or as a member and seeing the demo carrying an identification of a particular retail location can influence a person to visit that particular store to purchase the product, both approaches providing additional revenue streams from advertising that particular store.

According to other aspects, the invention includes apparatus, a method or system for providing, transmitting, or communicating, a plurality of different sets of information to a user or visitor in response to user inputs of successive or different keys or voice commands, revealed to the user, for example, at different stages of handling a product, or, provided by payment, such as by purchase of a product to which an individual set of information relates or by payment for membership of a club relating to or providing the information.

Examples of particularly suitable magic tricks and puzzles whose appeal and ease of learning are significantly enhanced by motion picture display include those requiring sleight of hand, mechanical/action puzzles include RUBIC cube, and sliding block puzzles in general and suitable motion riddles requiring visualization, the solutions to which are facilitated by graphical illustrations.

Magic tricks can be demonstrated by professional magicians in the theater and the spectators given the web site address for purchase of the tricks or for further motion picture demonstration possibly requiring purchase of the trick or paid membership of the site club for keys giving access to the secret locations on the web site providing the secrets/solutions for trick or puzzle performance.

Different second keys can be provided for different articles or products of the same type so that access to the second information set can be limited to the purchaser of that a specific article. In other words, second keys can be article or product specific as well as type specific.

BRIEF DESCRIPTION OF THE DRAWINGS

A particular embodiment of the invention will now be described by way of example only and with reference to the accompanying drawings in which.

Figure 1:
FIGS. 1 and 2 are schematic, front and rear views of the exterior of a first embodiment of product packaging of a magic trick.
Figure 2:
Figure 3:
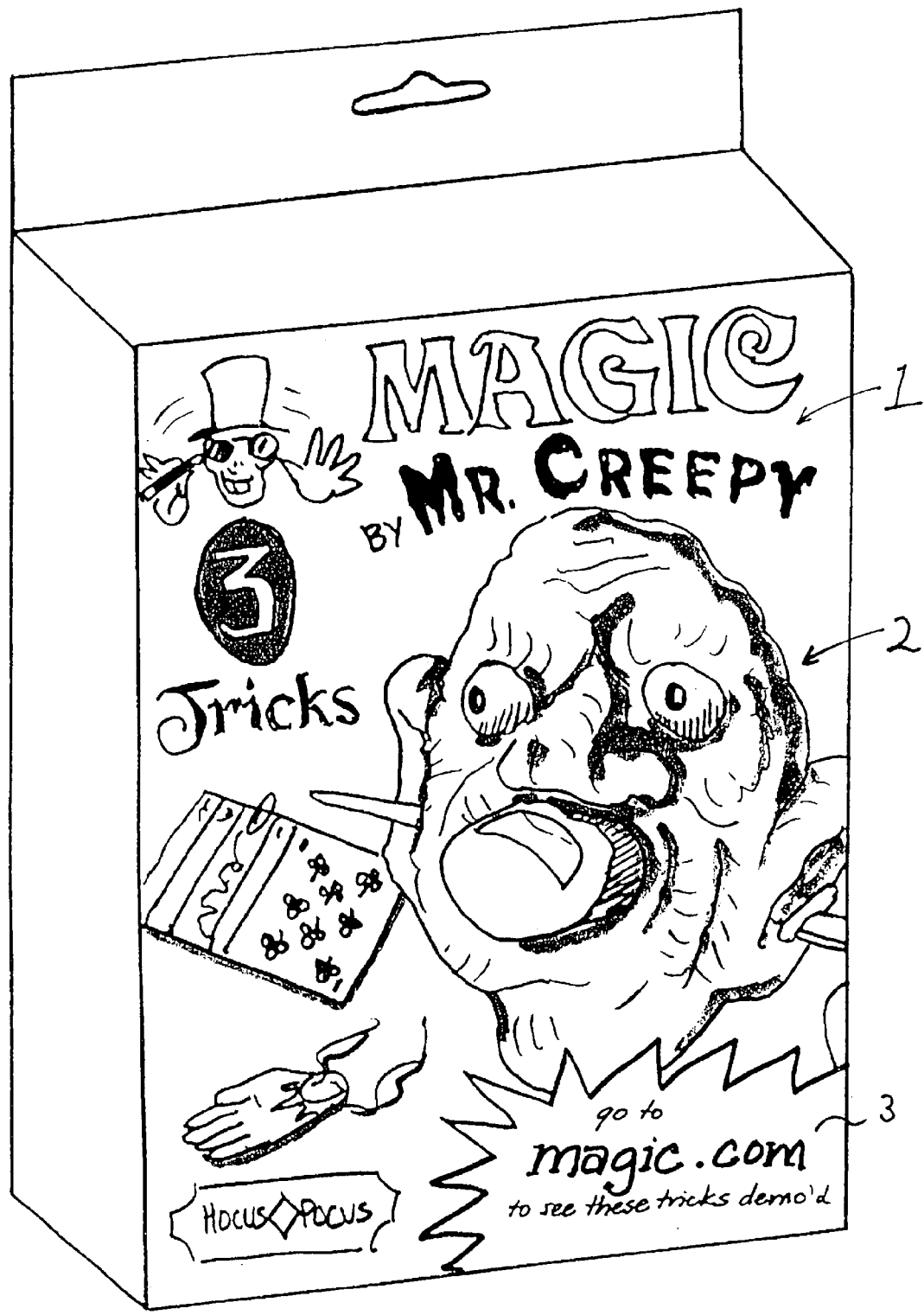
FIG. 3 is a front view of a second embodiment of product packaging.
Figure 4:
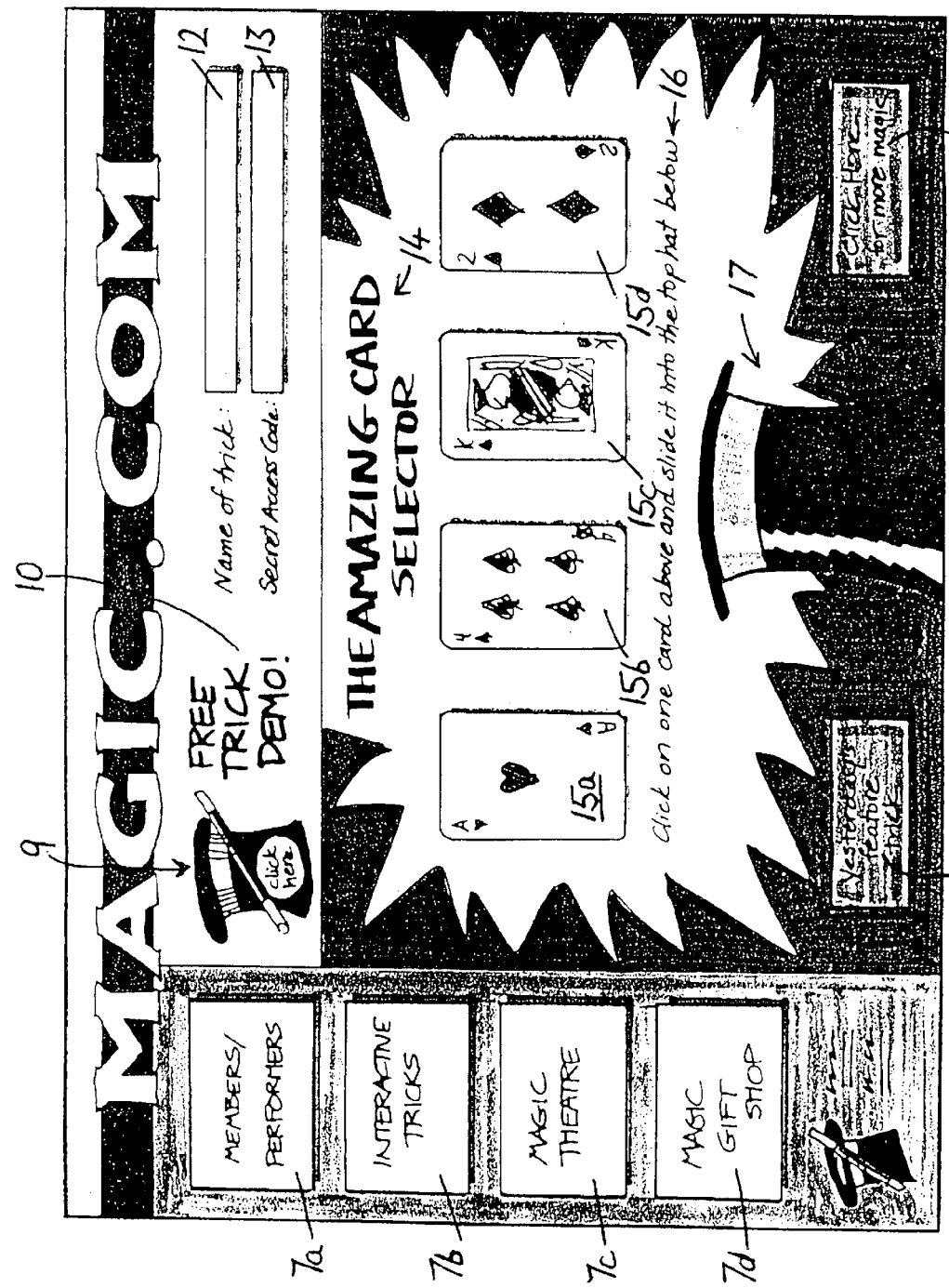
FIG. 4 shows a web page forming a graphical interface.

The first embodiment of product packaging shown in FIGS. 1 and 2, is a conventional box-like container having discrete areas carrying indicia illustrating the name or logo of the manufacture 1; the props of the trick at a significant stage of performance of the trick 2; identification and directions to the prospective purchaser to log on to an identified web site for an expert demonstration of the performance of the trick 3 and graphical illustration of selected successive stages in performance of the trick in cartoon strip format 4 and information concerning both the web site address and the presence of a secret access code (word or key) inside the packaging (or concealed under a removable portion or label, so as to be available to the purchaser following purchase of the product.

The web page provides a graphical user interface written in HTML or other suitable programming language (e.g. JAVA) providing a plurality of actuating areas being graphical representations of action initiators which link to other functions, possibly on other web pages and comprises a menu with a column of actuating areas or buttons 7a–7d on a left hand side displaying suitable identifying indicia for click access for MEMBERS/PERFORMER, INTERACTIVE TRICKS, MAGIC THEATRE, and MAGIC GIFT SHOP.

The address of the web site, "MAGIC. COM" is displayed across the top of the web page and an actuating image icon 9, displaying a top hat/wand is marked on an upper left portion of the web page adjacent identifying indicia 10 reading FREE TRICK DEMO. On an upper right portion of the page are data input areas 12 and 13, respectively, for inputting the trick name or other trick type identifier to initiate expert demonstration of the trick provided by a first information set, and a secret access code which is a protected (hidden) data input area with adjacent identifying descriptions and providing access to a secret location containing a second information set providing instructional information for performing the trick.

In the main central portion of the page, the trick identifying words THE AMAZING CARD SELECTOR 14 are displayed, below which a row of four, individually selectable, draggable images 15a–15d depicting playing cards, below which is instructional text 16 "click on one card above and slide it into the top hat below "directing the user to drag a card into an actuating area 17 depicting a top hat and linked to another trick continuing function.

Located adjacent the bottom of the page, to left and right sides of the top hat, respectively, are buttons 20 and 21 displaying the legends "Yesterday's feature trick" and "Click Here for more magic" providing clickable links to other web pages of the site.

A prospective purchaser notes the web site address and the product identifier on the product packaging in a store— or on an advertisement—accesses the site, and inputs the product identifier in input actuating area 12 causing the program to display a motion picture demonstration of the trick on the same or different page. The expert performance of the trick induces purchase of the product from the store, (or electronically from a manufacturer or reseller's web site), providing the purchaser with the key to the secret location of the second, instructional, information set.

The second information set provides successive action sequences of the trick.

In addition to the information sets for tricks and puzzles mentioned above, the web site includes stores of further information sets (third and fourth information sets) which provide motion picture demonstrations and instruction or secrets or solutions for effective performance of additional magic tricks. The tricks or puzzles are demonstrated without charge on the site to all visitors, as an inducement for visitors to become members for a fee which gives access privileges to the secrets, solutions for effective performance or solution. This provides an inducement both for persons visiting the site in response to invitations on product packaging and those visiting while web surfing or in response to other site advertisements to pay a fee to become members, thereby maximizing the revenue stream. Even when the secrets or solutions of the magic tricks or puzzles become known to the visitors they may still be influence to purchase the additional magic tricks either on-line, possibly from the present site or another manufacturer's or resellers site or in a store, thereby further enhancing the revenue stream.

A multiple revenue stream can therefore be obtained including fees/royalties from third party manufacturer's with invitations on their product packaging to visit the site and access keys to the secret locations available only after purchase of their product; site club membership fees which provide privileged access to instructional demonstrations and secrets/solutions of other magic tricks originating from the web site; and, from direct or indirect sales of hardware of both site originating and further magic trick or puzzles of third parties found by visits to the site.

It will be appreciated that the site can be navigated by voice instead of the keyboard/controller/mouse manipulations.

I claim:

1. A method of merchandising different types of magic tricks comprising the steps of:

providing a remote information site having a graphical interface accessible by one of line and wireless means and containing a first information set providing a motion picture demonstration of expert performance of each type of trick and a second information set providing graphical instructions for perfecting performance of each type of trick respectively, providing a supply of ones of different types of tricks with packaging for purchaseat a point of purchase remote from the information site with one of the packaging and an adjacent advertising display for each different type of magic trick marked with first indicia including an information site address and a first key identifying the type of magic trick and visible to a potential customer prior to purchasing the magic trick the packaging containing second indicia for that type of trick, and being a second key, different from the first key, and concealed from the customer until purchase of the trick;

whereby by a potential customer can access the first information set for an expert demonstration of a type of trick by inputting the graphical interface according to the first key for that type and a purchaser can access the second information set for the instructions for perfecting performance by inputting the second indicia revealed by opening the packaging after purchasing the magic trick.

2. The method of claim 1 wherein the remote information site is one of an internet and web site.

3. The method of claim 1 including the step of providing motion picture demonstrations of other magic tricks at the site and offering visitors access keys to graphical instructions for perfecting performance of the other types of magic tricks in return for payment of a membership fee.

4. The method of claim 1 wherein second information set comprises means to display successive action sequences of the trick of the motion picture of the first information set.

5. A method of merchandising different types of magic tricks comprising the steps of:

establishing a remote, electronically controlled information site containing first animated or motion picture information for demonstrating the different magic tricks and second graphical information for perfecting performance of the different magic tricks by a purchaser, accessing the first information, by the potential customer inputting at the web site a first indicia visibly marked on one of packaging of a magic trick and associated advertising material, and accessing the second information by the potential customer inputting at the web site a key according to a second indicia revealed only to a customer after purchasing the magic trick.

6. A method of marketing a magic club comprising the steps of:

providing a remote information site accessible to visitors by one of line and wireless means;

providing first and second information sets; the first information set providing motion picture demonstrations of performance of different types of magic tricks and the second information set providing motion picture instructional demonstration of solutions in performing said different types of magic tricks providing a graphical interface at the web site for access to the first and second information sets;

providing free access for a visitor to the web site via the graphical interface to the first information set and, providing a key for access to a visitor to the second information set by one of payment of a membership fee and purchase of a product associated with the web site.

7. The method of claim 6 wherein the web site has a third information set and a fourth information set similar to the first and second information sets and relating to different types of magic trick advertised at a remote location and purchased by the visitor;

providing free access for a visitor to the web site via the graphical interface to the first information set in response to input according to a first key identifying the type of magic trick and available to a potential customer prior to purchasing the magic trick and, providing access for a visitor to the second information set by input according to a different key revealed to a visitor only after purchase of the trick.

\* \* \* \* \*